(12) United States Patent
Gibson et al.

(10) Patent No.: US 8,737,040 B2
(45) Date of Patent: May 27, 2014

(54) HIGH PERFORMANCE REDOX CAPACITORS USING MATERIALS POSSESSING NON-STOICHIOMETRY AND DEFECT CHEMICAL EQUILIBRIUM

(75) Inventors: Charles P. Gibson, Oshkosh, WI (US); Annamalai Karthikeyan, Oshkosh, WI (US)

(73) Assignee: Wisys Technology Foundation, Inc., Madison, WI (US)

( * ) Notice: Subject to any disclaimer, the term of this patent is extended or adjusted under 35 U.S.C. 154(b) by 242 days.

(21) Appl. No.: 13/202,121

(22) PCT Filed: Feb. 18, 2010

(86) PCT No.: PCT/US2010/024539
§ 371 (c)(1),
(2), (4) Date: Aug. 18, 2011

(87) PCT Pub. No.: WO2010/096527
PCT Pub. Date: Aug. 26, 2010

(65) Prior Publication Data
US 2011/0297420 A1    Dec. 8, 2011

Related U.S. Application Data

(60) Provisional application No. 61/153,895, filed on Feb. 19, 2009.

(51) Int. Cl.
*H01G 9/00* (2006.01)

(52) U.S. Cl.
USPC ........... 361/502; 361/503; 361/504; 361/512; 361/517; 361/525

(58) Field of Classification Search
USPC ................. 361/502, 503–504, 512, 516–519, 361/523–525, 528–529
See application file for complete search history.

(56) References Cited

U.S. PATENT DOCUMENTS

| 8,243,420 B2* | 8/2012 | Kim et al. ..................... 361/502 |
| 2009/0162750 A1* | 6/2009 | Kawakami et al. ........ 429/218.1 |

* cited by examiner

*Primary Examiner* — Nguyen T Ha
(74) *Attorney, Agent, or Firm* — Boyle Fredrickson, S.C.

(57) ABSTRACT

A pseudocapacitor employs plates having an active material of a nanoparticles sized ceramic mixed ionic-electronic conductor such as may have the nominal formula of $ABO_3$, $A_2BO_4$, $AB_2O_4$, and $AO_2$, where A and B are metals. The active material may be prepared to promote sublattice vacancies to provide for the storage of additional charge.

20 Claims, 2 Drawing Sheets

HIGH PERFORMANCE REDOX CAPACITORS USING MATERIALS POSSESSING NON-STOICHIOMETRY AND DEFECT CHEMICAL EQUILIBRIUM

CROSS REFERENCE TO RELATED APPLICATION

This application claims is a national stage filing of PCT application PCT/US2010/024539 and claims the benefit of U.S. provisional application 61/153,895 filed Feb. 19, 2009, hereby incorporated by reference.

STATEMENT REGARDING FEDERALLY SPONSORED RESEARCH OR DEVELOPMENT

—

BACKGROUND OF THE INVENTION

The present invention relates to electrochemical supercapacitors and, in particular, to a supercapacitor where electrical storage occurs through a combination of electric double-layer capacitance and oxidation/reduction pseudocapacitance based on a new class of materials.

Supercapacitors have the ability to store unusually large amounts of charge compared to comparably-sized electrolytic capacitors. For example, a supercapacitor having the same dimensions as a D-cell battery is capable of storing hundreds of farads (F) of charge. In contrast, an electrolytic capacitor having the same dimensions will typically store a few tens of millifarads (mF) of charge. Thus, supercapacitors hold promise for storing electrical energy at high power densities and with high charge and discharge rates for a variety of applications including hybrid and/or electrical automobiles, industrial equipment (e.g., rubber tire gantries), electrical grid load-leveling, and power tools.

In comparison to batteries, supercapacitors currently in production have energy densities in the range of only about 1 to 10 Wh/kg in contrast to secondary cell batteries which have energy densities of 10 to 100 W hours per kilogram. On the other hand, the power density (being a measure of how quickly the energy may be released) for a supercapacitor is 10 times higher than that of a secondary cell battery or about 1000-5000 W per kilogram.

Batteries employ a Faradaic energy storage mechanism employing a chemical change in oxidation state of the electroactive material via electron transfer at the atomic or molecular level. This mechanism is relatively slow, which limits the power density of the batteries, and further creates stresses that limit cycle-life.

Conventional supercapacitors employ a non-Faradaic mechanism in which energy is stored electrostatically at the interface between electroactive solid and liquid electrolyte. In this case, there is no change in oxidation state (i.e., no electron transfer at atomic or molecular level). Compared to Faradic processes, non-Faradic processes are very fast, which allows for high power density, and they create little stress in the electroactive materials, which improves cycle-life.

The high capacitance of a conventional supercapacitor is obtained by the creation of an electric double layer at the electrode/electrolyte interface in which charges are separated by a distance of a few nanometers. Conventional supercapacitors are also known as electric double-layer capacitors.

Improved supercapacitors have been developed that store charge by a combination of Faradaic and non-Faradaic mechanisms. Supercapacitors using a combination of Faradaic and non-Faradic mechanisms will be termed herein "pseudocapacitors". Generally, a pseudocapacitor uses a metal oxide having relatively high electrical conductivity as an electroactive material (e.g., $RuO_2$), or else an electroactive polymer.

Pseudocapacitor electrode architectures based on these metal oxides generally use some carbon and/or organic binder in the fabrication process. The carbon improves electron transfer between the active material and current collecting plate. The binders hold the metal oxide and carbon particles together forming a continuum.

Pseudocapacitors can have both high energy density and power density; however, electroactive materials that perform well (e.g. $RuO_2$) can be expensive, scarce, and toxic, limiting their application and attractiveness.

SUMMARY OF THE INVENTION

The present invention provides a new type and class of pseudocapacitor electrode made of non-stoichiometric ceramic oxide materials having a new and additional mechanism of charge storage, pseudocapacitors using this electrode, and a method of manufacturing the same.

The new pseudocapacitor electrodes are made of nanomaterials that exhibit both electronic and ionic conductivity, and which are commonly known as mixed ionic-electron conductors (MIECs). Examples of MIECs include ceramic materials having nominal (idealized) compositions that correspond to one of the following groups: $ABO_3$ (e.g., perovskites), $A_2BO_4$ (including the alternative form $AB_2O_4$), and fluorites $AO_2$, where A and B are metals. Significantly, the materials used in the present invention can have stoichiometries (oxygen proportion) that differ somewhat from the idealized composition due to aliovalent doping or substitution. For example, a portion of metal A is replaced by metal A', and/or a portion of metal B is replaced by metal B' (A, A', B and B'=La, Sr, Ca, Mn, Fe, Ni, Co, Ga, Ce, Gd, or other metal). This creates materials that possess compositional non-stoichiometry (change in oxygen proportion), which results in the formation of vacancies in the cation or anion sublattice, or both. Non-stoichiometry can also created by preparing materials with deviation in idealized compositions. For example, in a perovskite where A/B=1, an intentional deviation as excess/deficiency in A or B atom would also create vacancies in A or B sites depending on A/B>1 or A/B<1. Improved pseudocapacitor performance is achieved because vacancies permit the storage of additional charge, in addition to the charge that is stored by conventional processes at the electrode/electrolyte interface. In contrast, previous designs based on transition metal oxides possess minimal to no ionic vacancies.

Also disclosed are a new type of high temperature pseudocapacitor electrode which contains nanomaterials of a composition as described above. The electrode architecture includes a current collector and the electroactive nanomaterial (or mixture of nanomaterials) coated on the current collector, and may also include additives such as carbon, metal particles or fibers, and binders. This type of pseudocapacitor can be manufactured to operate in the temperature range from 200K to 2000K depending on application environment and requirement. The high temperature pseudocapacitors (>500K) may use metallic flux (single metal or an alloy) or other semiconducting oxides as additives to improve electron transfer or as binders or both and with or without the use of carbon. The electrode material disclosed above is used either as cathode or anode or both depending on method of preparation, levels and choice of substitutional material A' and B'. In this embodiment, the anion sublattice of the above-described materials is not limited to oxygen but may use other chalcogenides X (X=O, S, Se, Te). High energy storage and power densities are achieved by high surface area of the nanomaterials, anion and cation defect, and amplified defect states instigated by mechanisms such as space charge effects and surface segregation which are exclusive mechanisms for nanoceramics.

DETAILED DESCRIPTION OF THE PREFERRED EMBODIMENT

Figure 1:
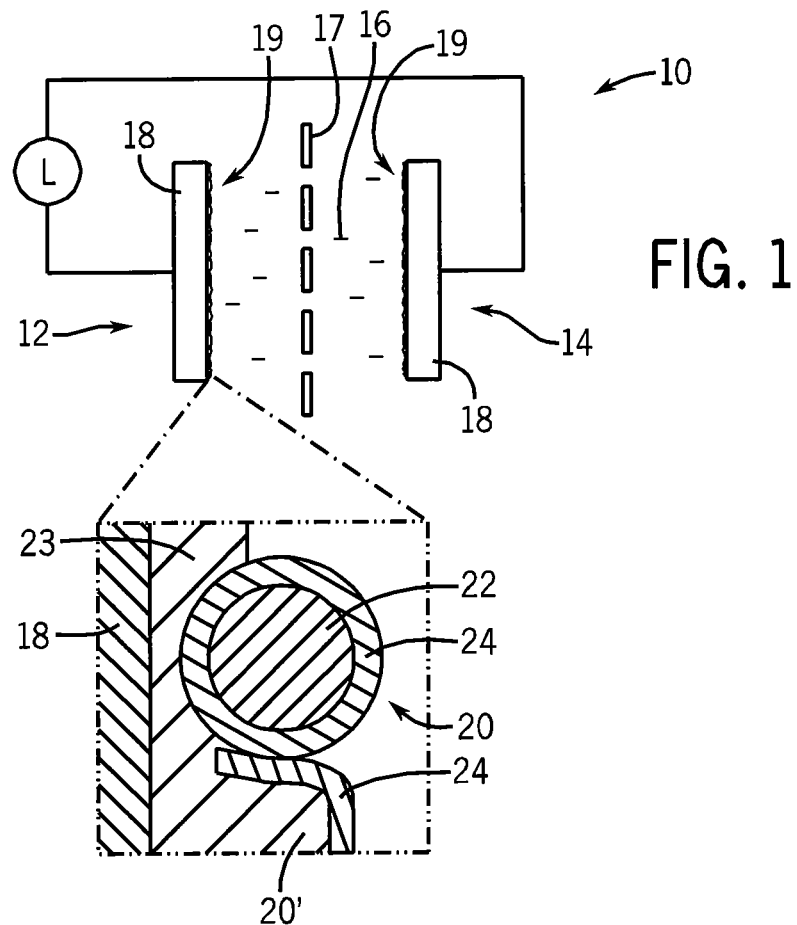
FIG. 1 is a simplified diagram of a pseudocapacitor suitable for using an electrode of the present invention showing a idealized representation of the electrode nano structure.

Referring now to FIG. 1 a supercapacitor 10 employing the present invention may provide for a first capacitor plate 12 opposed to a second capacitor plate 14. The plates 12, 14 shown are generally planar; however, as will be understood in the art, they may generally be wound as interleaving spirals to provide a more compact volume and other topologies are also possible.

The plates 12 and 14 may be of different or identical materials and may be constructed of an electrically continuous conductor 18 having a rough or porous coating 19 thereon. The coating 19 is intended to provide a high surface area and, in the preferred embodiment, is composed of ceramic nanoparticles 20 having an interior portion 22 and a surface region 24 in electrical communication with the continuous conductor 18 and electrolyte 16. The nanoparticles 20 may not be discrete but made from part of a continuous nanoporous structure per nanoparticle 20. The interior portion 22 and surface regions 24 may be different materials or the same material.

The plates 12, 14 with coating 19 may be in communication with an electrolyte 16 and may be optionally separated by a porous spacer 17 allowing passage of the electrolyte therethrough but providing an insulating barrier against contact of the plates 12, 14.

The electrolyte 16 may be, for example, an aqueous or nonaqueous solution of an inorganic or organic salt (e.g., LiCl, NaCl, KCl, KOH, $KNO_3$, $Na_2SO_4$, $Li_2SO_4$, tetraetyhlammonium tetrafluoroborate). Non-aqueous solvents suitable for electrolyte 16 include acetonitrile, polycarbonates (e.g., propylene carbonate), organosilicons, and ionic liquids (with or without added salt) using the above solutes. The electrolyte 16 may be a liquid, gel, or solid, in either dense or porous form, or a molten liquid or salt that provides a high ionic conductivity of ions such as $Ag^+$, $Na^+$, $Li^+$, $H^+$, $OH^-$, $H_3O^+$, or $F^-$, $Br^-$, $NO_3^-$, $SO_4^{2-}$ $Cl^-$, $O_2^-$.

The nanoparticles 20 may have a mean diameter varying from 2 nm to 2 μm and may be attached to the continuous conductor by a conductive polymer or polymer composite material 23. The conductive material 23 may contain different forms of carbon including carbon fiber and annotates, a conducting polymer, metals or metal compounds from the group of silver, nickel, gold, platinum, tantalum or other metals and their alloys and need not and generally will not be planar.

Alternatively, the continuous conductor 18 may be identical with the conductive material 23 and may, for example, be a polymer carbon composite. Generally, the ceramic nanoparticles 20 may be non-sintered, partially sintered, amorphous phase or partially amorphous phase.

The nanoparticles 20 may be applied to the plates 12 and 14 by thin film coating procedures such as sol-gel coating, ceramic slurry coating, sputtering or the like. The nanoparticles 20 may be joined to each other and the plates 12 or 14 using a binder such as poly(tetrafluoroethylene), poly(vinylidene fluoride), poly(vinyl alcohol).

Figure 2:
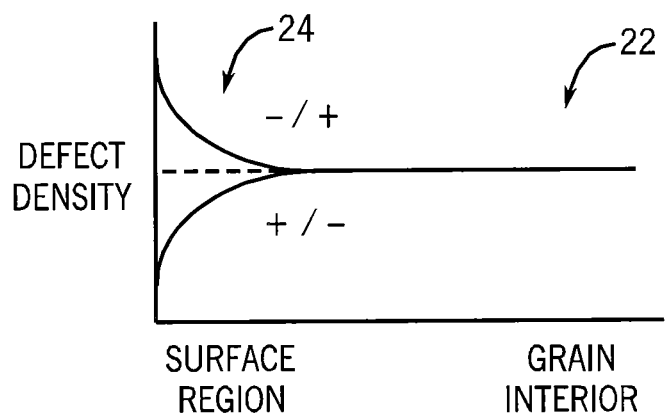
FIG. 2 is a graph showing defect density of the nanostructures as a function of distance from the surface of the nanostructures.

Referring now to FIG. 2, the surface region 24 of the nanoparticles 20 may have increased defect density, from impurity or off-stoichiometry preparation or aliovalently doping of the material of the surface region 24, and a high redox capability.

In a first embodiment of the invention, the nanoparticles 20 may be mixed conducting ceramics with a surface region 24 exposing perovskite-like structure $ABO_3$ and/or related structures like oxides $A_2BO_4$, and fluorites $AO_2$ where A and B are metals and O is oxygen. Significantly, the materials used in the present invention's electrodes have stoichiometries that differ somewhat from the idealized composition due to aliovalent doping or substitution. For example, a portion of metal A is replaced by metal A', and/or a portion of metal B is replaced by metal B' (where A, A', B and B'=Sr, La, Co, Fe, Ni, Mn, Ti, Gd, Ce, Zr, Sc, an element from the lanthanide series, a mixed metal from the lanthanide series).

Significantly either metal A or B may be mixtures of metals, meaning that different A or B lattice sites may be occupied by different metals. For example, $LaNiO_3$ (following the nominal formula $ABO_3$) may be compounded as: $(La_{0.8}Sr_{0.2})NiO_3$, or $(La_{0.8}Sr_{0.1}Ce_{0.1})NiO_3$, or $(La_{0.6}Gd_{0.2}Sr_{0.1}Ce_{0.1})NiO_3$, etc.

Defects may also be introduced by slightly increasing a portion of a metal A or B in such a way that $A/B \ne 1$. These materials provide special properties and structural integrity for anion and cation vacancies. Such defect states are achieved by preparative conditions, aliovalent doping of materials A' and B' replacing either A and B atom sites, thermochemical treatments, and size dependant properties of nanomaterials such as space charge effects and surface segregation. Generally the doping may be impurity or aliovalently doped with general formula $AA'BB'O_{3 \pm \delta}$ or $(AA')_2 BB'O_{4 \pm \delta}$ (where δ is less than one) as a main component leading to oxygen and/or A or B site vacancies which support charge storage.

Some examples of nanoparticle materials are $LaNiO_3$, $La_2NiO_4$, $LaNi_2O_4$, etc. The common properties of these materials are stability of the structure for anion and cation vacancies and their thermal and chemical equilibrium with their environment. Such vacancies support additional redox performance and increased energy storage in devices.

Cells based on A=La and B=Ni show very high stability and electrochemical storage performance. Thermal treatments and conditioning as high as 1600K show high stability of nano materials for high temperature energy storage applications. The active materials possess cation and/or anion vacancies depending on the valancy of the substitutional material or impurities and can be used either as cathode or as anode materials for energy storage devices such as pseudocapacitors and related devices.

In a second embodiment, the nanoparticles 20 are formed from the above material with chalcogenides such as S, Se, and Te or mixed chalcogenides to replace a portion of the oxide ions in the lattice, which can be realized by synthesizing materials with similar structural chemistry.

One or several series or parallel combinations of embodiment shown in FIG. 1 may be sealed from external environment using standard and/or new type electrochemical packaging technologies generating a capacitor device. Several such devices may be connected in series or parallel configurations to assemble a module of higher voltage or current using standard and/or new type of module assembly for end users applications.

Example I

In this example, the nanoparticles 20 are formed of nanophase $LaNiO_3$ derived from an energetic precursor.

(A) Synthesis of Energetic Precursor.
1. Dissolve 2.1650 g lanthanum nitrate hexahydrate and 1.5995 g nickel nitrate hexahydrate with enough deionized water to bring the final volume to 100 mL. Place in a 250 mL flask. Purge the flask with nitrogen.
2. Place 1.8645 g ammonium oxalate hydrate and 50 mL deionized water in a 150 mL beaker. Stir until dissolved.
3. Under a blanket of nitrogen, transfer the ammonium oxalate solution to the flask containing the lanthanum and nickel salts. Filter the solution and collect the precipitate on filter paper. Wash with filtrate with deionized water. Dry the product at low temperature via lyophilization.

The yield is 3.7395 g of a thermally-unstable energetic precursor comprising a mixed lanthanum/nickel salt containing both oxidizing and reducing ligands.

(B) Initial Conversion of Energetic Precursor.
1. Charge an alumina boat with 1.00 g of the energetic precursor, and place the boat into a tube furnace. Connect the reaction tube to a N2/H2 (95:5) gas mixture and purge the tube.
2. Under a slow flow of $N_2/H_2$, increase the temperature of the sample from room temperature to 185° C. at a rate of 5° C./min. Hold at that temperature for 8 hours.
3. Next, increase the temperature from 185° C. to 200° C. at a rate of 0.1° C./min. Hold at that temperature for 12 hours.

(C) Final Conversion to Nano-$LaNiO_3$.
1. ex situ: Heat the product obtained from (B) to a temperature of 700° C.
2. in situ: Combine the desired amount of product from (B) with additives and coat electrode substrate. Heat under inert atmosphere to a temperature sufficient to convert product from (B) to nano-$LaNiO_3$.

For example, combine 202.2 mg of product from (B) with 1.4 g of a 7% aqueous cornstarch gel. Coat onto carbon fibers and then place the assembly into a tube furnace. Heat under inert atmosphere to 800° C. The product is a composite electrode containing carbon fiber (current collector), with an electroactive coating comprising carbon foam and nano-$LaNiO_3$.

Example II

In this example, a pseudocapacitor electrode is constructed using nano-$LaNiO_3$, activated carbon, and a binder.

(A) Constructing the Electrode.
80 mg of nano-$LaNiO_3$, 10 mg of activated vegetable carbon, and 10 mg of polyvinylidenefluoride are placed in an agate mortar. A small amount of N-Methyl-2-pyrrolidone is added and the mixture is ground with a pestle to form a slurry. The surface of a stainless steel disk (¾" diameter by 0.010" thick) was prepared by sanding (P 120 grit), washing with deionized water, and drying at 100° C. A thin uniform coat of the aforementioned slurry was painted onto the prepared disk. The coated disk was dried at 100° C.

Figure 3:
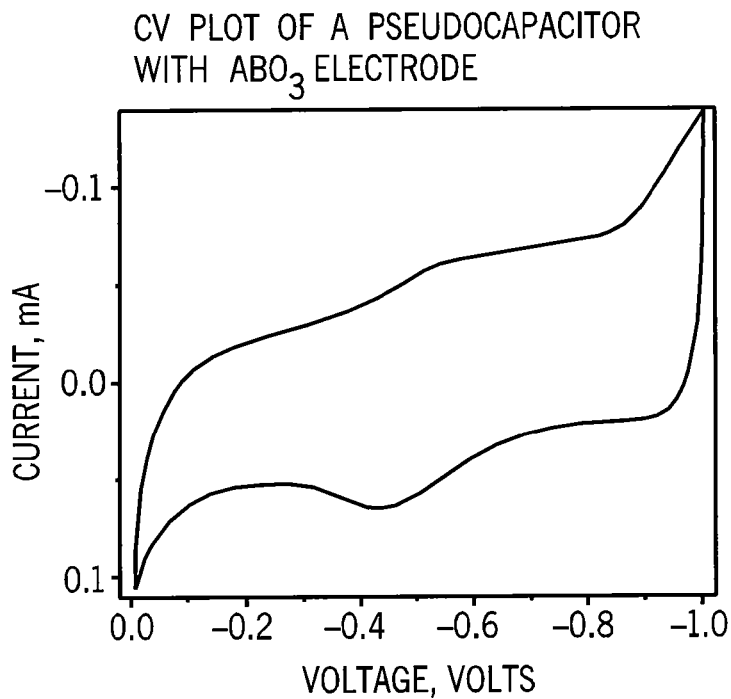
FIG. 3 is a cyclic voltammogram showing the electrochemical performance of an electrode fabricated in accordance with this invention.
Figure 4:
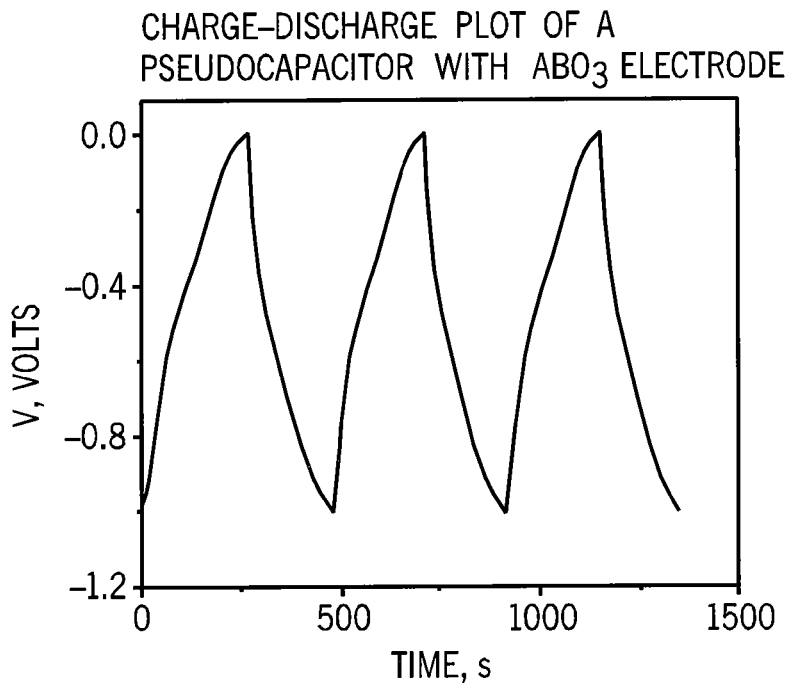
FIG. 4 shows the charge-discharge performance of an electrode fabricated in accordance with this invention.

(B) Evaluating the Performance of the Electrode.
Electrochemical performance of the disk was evaluated in a 3-electrode configuration using cyclic voltammetry (FIG. 3) and charge-discharge analysis (FIG. 4), which validated the electrode's performance as a capacitor. The specific capacitance value of the electroactive coating material (i.e., nano-$LaNiO_3$) was 150 Farads per gram.

Example III

In this example, a capacitor is fabricated from electrodes made as described in Example II.

(A) Fabricating the Capacitor.
An electrode assembly made by stacking an electrode, a paper disk (Whatman I filter paper), and a second electrode so that the coated faces of the electrodes face each other. The electrode assembly was placed in a standard CR-2016 stainless steel battery case (MTI Corporation). The case was filled with an electrolyte (1.0 M tetraethylammonium tetrafluoroborate in acetonitrile) and then sealed.

(B) Evaluating the Performance of the Capacitor.
The performance of the capacitor was evaluated in a 2-electrode configuration using cyclic voltammetry. The capacitor had a capacitance of 0.5 Farads at 2.7 V. The volumetric energy density of this device was 9.4 Wh/L.

These experiments suggest that this technique can produce a capacity of at least 5 Farad per gram of nanoparticles at one volt when measured by cyclic voltammetry at a scan rate of 5 mV/sec and using a liquid electrolyte selected from one of the following group: 1 M H2SO4 in water, 2 M KNO3 in water, 6 M KOH in water, 1 M LiClO4 in water, and 1 M tetraethylammonium tetrafluoroborate in acetonitrile.

It is specifically intended that the present invention not be limited to the embodiments, illustrations and preparative examples contained herein, but include modified forms of those embodiments including portions of the embodiments and combinations of elements of different embodiments as come within the scope of the following claims.

We claim:

1. An electrode for an electrochemical pseudocapacitor comprising:
   a current collector;
   a plurality of electroactive nanoparticles in electrical communication with the current collector, the nanoparticles having mean diameter varying from 2 nm to 2 μm;
   wherein an exposed surface of the nanoparticles comprises a ceramic mixed ionic-electronic conductor.

2. The electrode of claim 1 wherein the ceramic mixed ionic-electronic conductor incorporates substantial sublattice vacancies providing for the storage of charge.

3. The electrode of claim 1 wherein the exposed surface of the nanoparticles comprises an active material having a nominal formula selected from the group consisting of $ABO_3$, $A_2BO_4$, $AB_2O_4$, and fluorite $AO_2$, where A and B are metals.

4. The electrode of claim 3 wherein A or B are mixtures of metals.

5. The electrode of claim 3 wherein the element A includes an element from the lanthanide series, and element B includes an element from the transition series.

6. The electrode of claim 1 further including a second electrode to provide a cathode anode pair and an electrolyte electrically joining the electrodes.

7. The electrode of claim 6 further including an electrically insulating permeable layer that separates the electrodes.

8. The electrode of claim 1 wherein the exposed surface of the nanoparticles comprises an active material having a nominal formula selected from the group consisting of: $ABO_3$, $A_2BO_4$, $AB_2O_4$, and fluorite $AO_2$, where A and B are metals or mixtures of metals.

9. An electrode for an electrochemical pseudocapacitor comprising:
a current collector;
a plurality of electroactive nanoparticles in electrical communication with the current collector, the nanoparticles having mean diameter varying from 2 nm to 2 μm;
wherein an exposed surface of the nanoparticles comprises a ceramic mixed ionic-electronic conductor
wherein the exposed surface of the nanoparticles comprise an active; material having a nominal formula selected from the group consisting of: $ABO_3$, $A_2BO_4$, $AB_2O_4$, and fluorite $AO_2$, where A and B are metals;
wherein the said active material has a general formula selected from the group consisting of: $AA'BB'O_{3\pm\delta}$, $AA'O_{2\pm\delta}$, and $(AA')_2BB'O_{4\pm\delta}$, and $AA'(BB')_2O_{4\pm\delta}$ where δ is less than 1.

10. The electrode of claim 9 wherein the elements A, A' are selected from the group consisting of: La, Ce, Gd, Se, Zr, Mg, Ca, Ba, Sr, Se, Ti, and elements B, B' are selected from the group Sc, Ti, V, Mn, Fe, Co, Ni, Cu, Zn.

11. The electrode of claim 9, wherein the said active material is off stoichiometric to have a nominal formula selected from the group consisting of $ABO_3$, where A/B≠1, $A_2BO_4$, where A/B≠2, $AB_2O_4$, where B/A≠2 and $AA'O_{2\pm\delta}$ where A+A'≠1.

12. The electrode of claim 9 wherein the active material is a material having the nominal formula of $ABO_3$.

13. The electrode of claim 12 wherein the active material has a general formula of $AA'BB'O_{3\pm\delta}$ where δ is less than 1.

14. The electrode of claim 12 wherein the active material has a nominal formula of $ABO_3$ where A/B≠1.

15. An electrode for an electrochemical pseudocapacitor comprising:
a current collector;
a plurality of electroactive nanoparticles in electrical communication with the current collector, the nanoparticles having mean diameter varying from 2 nm to 2 μm;
wherein an exposed surface of the nanoparticles comprises a ceramic mixed ionic-electronic conductor;
wherein the electrode provides a charge storage capacity is at least 5 Farad per gram of nanoparticles at one volt when measured by cyclic voltammetry at a scan rate of 5 mV/sec and using a liquid electrolyte selected from one of the following group: 1 M $H_2SO_4$ in water, 2 M $KNO_3$ in water, 6 M KOH in water, 1 M $LiClO_4$ in water, and 1 M tetraethylammonium tetrafluoroborate in acetonitrile.

16. A method of manufacturing an electrode for a pseudocapacitor (10) comprising the steps of:
preparing a current collector (18) of electrically conductive material;
attaching to the current conductor in electrical communication a plurality of nanoparticles (20) having mean diameter varying from 2 nm to 2 μm, an exposed surface (24) of the nanoparticles being substantially composed of an active material of ceramic mixed ionic-electronic conductor.

17. The method of claim 16 wherein the ceramic mixed ionic-electronic conductor is processed by aliovalent or impurity doping to incorporate substantial sublattice vacancies providing for the storage of charge.

18. The method of claim 16 wherein the step of attaching uses a technique selected from the group consisting of: thin film coating, sol-gel coating, sputtering and ceramic slurry coating.

19. The method of claim 16 further including the step of mixing the nanoparticles with a binder (23) to provide a continuous electrical path joining the nanoparticles.

20. The method of claim 16 further including the step of mixing the nanoparticles with an additive that improves electrical conductivity of the nanoparticles.

* * * * *

UNITED STATES PATENT AND TRADEMARK OFFICE
CERTIFICATE OF CORRECTION

| | | |
|---|---|---|
| PATENT NO. | : 8,737,040 B2 | Page 1 of 1 |
| APPLICATION NO. | : 13/202121 | |
| DATED | : May 27, 2014 | |
| INVENTOR(S) | : Charles P. Gibson et al. | |

It is certified that error appears in the above-identified patent and that said Letters Patent is hereby corrected as shown below:

IN THE CLAIMS

CLAIM 9　　　　　Delete "comprise" and substitute therefor
Col. 7, Line 15　　　-- comprises --

CLAIM 10　　　　Delete "Se" and substitute therefor
Col. 7, Line 25　　　-- Sc --

CLAIM 10　　　　Delete "Se" and substitute therefor
Col. 7, Line 26　　　-- Sc --

Signed and Sealed this
Seventh Day of October, 2014

Michelle K. Lee
*Deputy Director of the United States Patent and Trademark Office*